United States Patent [19]

Seidel et al.

[11] Patent Number: 5,044,911
[45] Date of Patent: Sep. 3, 1991

[54] APPARATUS FOR INJECTION CASTING METALLIC NUCLEAR ENERGY FUEL RODS

[75] Inventors: Bobby R. Seidel, Idaho Falls; Donald B. Tracy, Firth, both of Id.; Vernon Griffiths, Butte, Mont.

[73] Assignee: United States Department of Energy, Washington, D.C.

[21] Appl. No.: 333,935

[22] Filed: Apr. 6, 1989

[51] Int. Cl.⁵ .............. B22D 18/06; G21C 21/00
[52] U.S. Cl. .................. 425/110; 164/254; 164/256; 249/61; 249/120; 249/135; 264/0.5; 376/261; 425/449; 425/546
[58] Field of Search ............ 249/135, 117, 120, 134, 249/139, 61, 62, 114.1, 115; 376/261; 425/269, 275, 110, 449, 182, 186, 546; 264/0.5; 164/253, 254, 256

[56] References Cited

U.S. PATENT DOCUMENTS

| 557,351 | 3/1896 | Armstrong | 249/135 |
|---|---|---|---|
| 1,887,729 | 11/1932 | Marvin | 249/135 |
| 2,116,483 | 5/1938 | Williams et al. | 249/135 |
| 3,872,913 | 3/1975 | Lohikoski | 164/421 |
| 3,945,240 | 3/1976 | Brown | 249/134 |
| 4,174,089 | 11/1979 | Kienow et al. | 249/134 |
| 4,204,975 | 5/1980 | Thiele | 252/628 |
| 4,414,285 | 11/1983 | Lowry et al. | 428/577 |
| 4,678,720 | 7/1987 | Hsu et al. | 164/463 |
| 4,721,278 | 1/1988 | Vallak et al. | 249/106 |

FOREIGN PATENT DOCUMENTS 59-159243  9/1984  Japan ..................... 249/135

OTHER PUBLICATIONS

Argonne News, Jan.-Feb. 1989, p. 6.

Primary Examiner—Jay H. Woo
Assistant Examiner—James P. Mackey
Attorney, Agent, or Firm—Tyrone Davis; Robert J. Fisher; William R. Moser

[57] ABSTRACT

Molds for making metallic nuclear fuel rods are provided which present reduced risks to the environment by reducing radioactive waste. In one embodiment, the mold is consumable with the fuel rod, and in another embodiment, part of the mold can be re-used. Several molds can be arranged together in a cascaded manner, if desired, or several long cavities can be integrated in a monolithic multiple cavity re-usable mold.

13 Claims, 4 Drawing Sheets

APPARATUS FOR INJECTION CASTING METALLIC NUCLEAR ENERGY FUEL RODS

CONTRACTUAL ORIGIN OF THE INVENTION

The United States Government has rights to this invention pursuant to Contract W-31-109-ENG-38 with the United States Department of Energy.

BACKGROUND OF THE INVENTION

This invention relates to methods and apparatus for injection casting metallic fuel rods for use in fast nuclear reactors, and more particularly, to consumable and re-usable molds for use in making metallic nuclear energy fuel rods.

Metallic fuel rods are currently used in fast reactors. Metallic fuel is preferred over ceramic fuel because the natural behavior of metallic fuel counters upset conditions in the reactor, resulting in more stable, safe generation of nuclear energy. Also, metallic fuel is more easily processed and fabricated than ceramic fuel, resulting in more economic energy production.

Metallic fuel rods have historically been cast in quartz molds which are coated on the inside with high temperature ceramic paint. The quartz molds are long, thin tubes which are open at one end. Metallic fuel rods are made in the quartz molds by first placing solid fuel stock in a crucible and placing the crucible in a sealed chamber with a plurality of molds. The fuel in the crucible is melted and the chamber is evacuated. The open ends of the molds are placed in the liquid and the chamber pressure is increased substantially. The increased pressure forces liquid fuel into the cavities of the molds, and when the fuel in the molds has solidified, the molds are removed from the melt.

To extract the fuel from the quartz molds, the quartz molds must be broken. In this process, the molds are destroyed and discarded. This creates an environmental problem, however, because the molds are contaminated with radioactive fuel. Thus, there is a need for methods and apparatus for molding metallic fuel rods which reduce radioactive wastes and thus create fewer environmental hazards.

The one-time use of quartz molds as just described is also relatively inefficient because a mold must be fabricated for each fuel rod produced. Thus, there is also a need for more efficient methods and apparatus for producing metallic fuel rods.

Accordingly, one object of this invention is to provide new and improved methods and apparatus for producing metallic fuel rods for the production of nuclear energy.

Another object is to provide new and improved methods and apparatus for making metallic fuel rods which reduce radioactive waste.

Still another object is to provide new and improved methods and apparatus for making metallic fuel rods which are more efficient than known methods and apparatus.

A still further object is to provide new and improved methods and apparatus for making metallic fuel rods from molds which are consumable with the rods when the fuel is irradiated.

Yet another object is to provide new and improved methods and apparatus for making metallic fuel rods in molds which are at least partially reusable.

SUMMARY OF THE INVENTION

In keeping with one aspect of this invention, molds for making metallic fuel rods are provided which present reduced risks to the environment by reducing radioactive waste. Metallic fuel rods include nuclear fuel such as uranium or the like, and usually a metallic alloying element. Uranium will be used here to describe the invention, although the use of other fuels is contemplated. The alloying element may be any metal which improves the nuclear fuel. Zirconium is suited to this purpose, and will be used here to describe the invention, although the use of other suitable metals is contemplated.

In one embodiment, a consumable mold has a thin wall which has one open end. The mold is made of a suitable alloying element, such as zirconium, which is a desirable alloying element. The open end of the mold is dipped in molten fuel stock which includes uranium and a selected percentage of zirconium to produce a desired uranium-zirconium alloy. A fuel rod which is cast in the mold is not removed from the mold, but is placed in a nuclear reactor with the mold still surrounding the fuel rod. The mold irradiates with the rod in the nuclear reactor. Upon irradiation, the uranium and zirconium cast into the zirconium mold and the zirconium in the mold inter-diffuse to produce a metallic alloy with an average percentage of zirconium. The percentage of zirconium in the melt is selected to obtain a desired average of zirconium in the combined mold/fuel rod which achieves optimal fuel rod performance.

In another embodiment, a two-part mold is used. One part of the mold is a long tube with an open end, and is re-usable. The long tube may be made of quartz or any other suitable material. The second part of the mold has a cavity which is open at both ends and is removably secured to the open end of the long tube. The second part of the mold is dipped into the molten fuel in a crucible during fabrication, and may be destroyed or become unusable when the fuel rod is removed from the mold. The long tube of the mold may be re-used, while the second part is replaced after each use. Several re-usable molds can be arranged together in a cascaded manner, if desired, or several long tubes can be integrated in a monolithic multiple cavity re-usable mold.

BRIEF DESCRIPTION OF THE DRAWINGS

The above-mentioned and other features of this invention and the manner of obtaining them will become more apparent, and will be best understood by reference to the following description, taken in conjunction with the accompanying drawings, in which.

DETAILED DESCRIPTION

Figure 1:
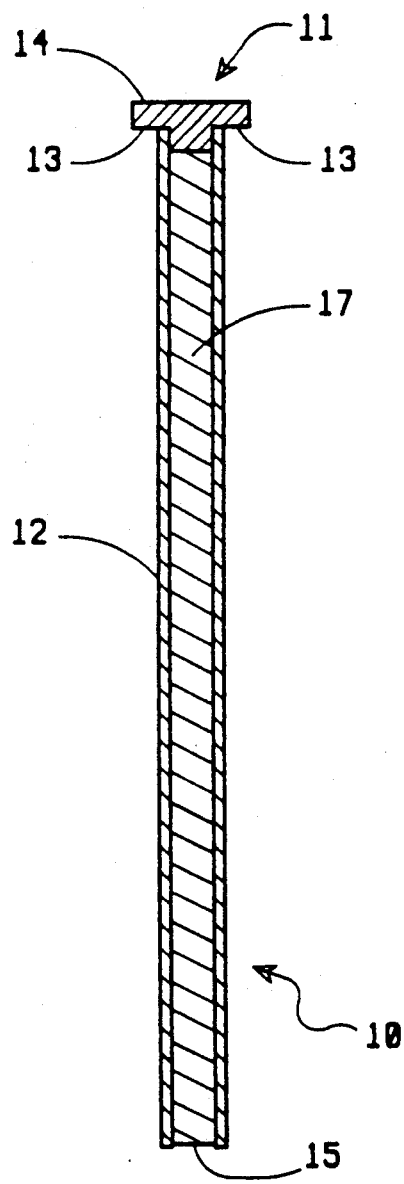
FIG. 1 is a cross-sectional side view of a consumable mold made in accordance with the principles of this invention.

As seen in FIG. 1, a consumable mold 10 has a long, cylindrical wall 12, a closed end 11 and an open end 15. The wall 12 may have any suitable dimensions, such as about 12–48 (and nominally 24) inches in length with about a 0.015–1.0 (and nominally 0.175) inch inner diameter. The wall 12 may also have any suitable thickness, such as about 0.005–0.1 (and nominally 0.010) inch. The closed end 11 may be sealed by an end piece 14 which is fabricated separately and secured to the wall 12 by any suitable means, as in FIG. 1. The closed end 11 may also be sealed by welding the end 11, or by some other structure which is integral with the wall 12, as at 38 in FIG. 4, if desired. The end piece 14 in FIG. 1 may include shoulders 13 which extend beyond either side of the wall 12.

The mold 10 is made of any suitable metal which does not readily melt in molten nuclear fuel such as uranium, plutonium or the like. The metal selected for the mold 10 must also be sufficiently strong, and must be capable of forming an acceptable alloy with the nuclear fuel. Zirconium is a suitable alloying element for a uranium-zirconium alloy fuel, for example, although the use of other metals is contemplated.

Figure 2:
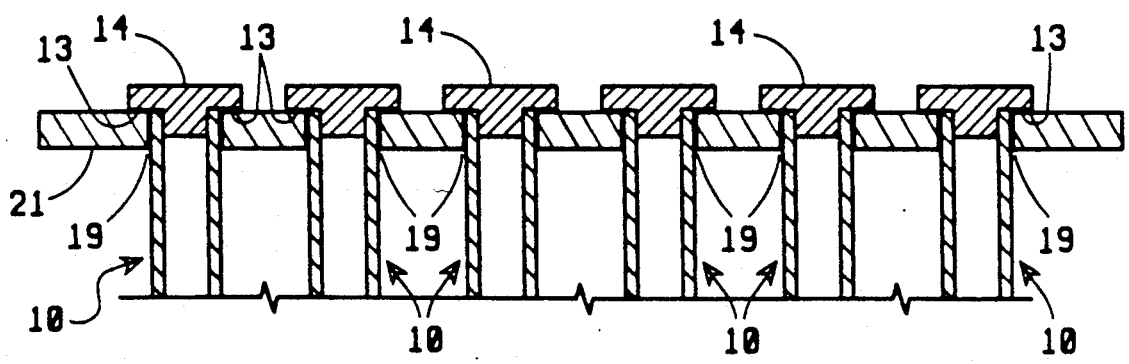
FIG. 2 is a cross-sectional side view of a plurality of the molds shown in FIG. 1.

The mold 10 can be used to make a fuel rod 17 (FIG. 1). A plurality of fuel rods can be made simultaneously by placing a plurality of molds 10 through openings 19 in a plate 21, as shown in FIG. 2, if desired. The shoulders 13 rest on the plate 21 to secure the molds 10 in place.

Figure 3:
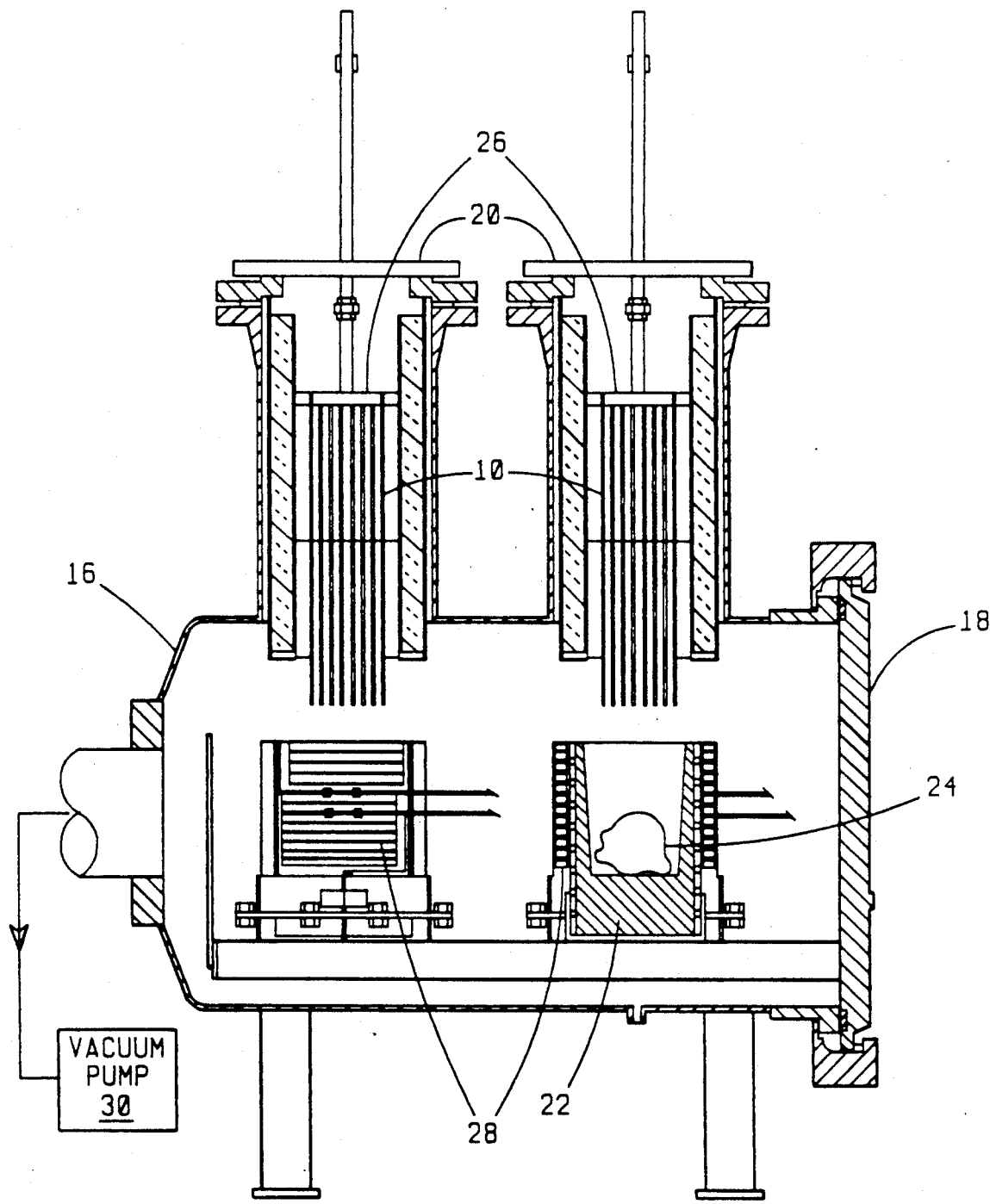
FIG. 3 is a partially cutaway elevational side view of a chamber for producing fuel rods in accordance with the principles of this invention.

The plate 21 and molds 10 are then placed in a chamber 16, as seen in FIG. 3. The chamber 16 includes a door 18 which may be sealed so that the atmosphere inside the chamber 16 can be controlled. The chamber 16 also includes at least one, and preferably two sealable openings 20 in the top of the chamber 16. One or more crucibles 22 containing fuel stock 24 can be placed in and removed from the chamber 16 through the door 18.

One or more assemblies 26 (FIG. 3) of molds 10 can be inserted in and removed from the chamber 16 through the openings 20. The assemblies 26 can be controlled mechanically from outside of the chamber 16 through the openings 20, or by remote control, if preferred.

The fuel stocks 24 in the crucibles 22 are melted in the crucibles 22 by electrical heating coils 28 or the like The chamber 16 is sealed and evacuated (100–1000 millitorr) by a vacuum pump 30 after the assemblies 26 and crucibles 22 are placed in the chamber 16. When the fuel stocks 24 are melted and the chamber 16 is evacuated, the open ends 15 of the molds 10 are lowered into the molten fuel stocks 24.

The cavities of the molds 10 are, of course, evacuated when the ends 15 enter the molten fuel stock. The pressure in the chamber 16 is then increased, forcing molten fuel into the molds 10. The molds 10 are then removed from the crucibles 22 and allowed to cool, solidifying the fuel rods 17. The assemblies 26 are then removed from the chamber 16. After further processing, the molds 10, with the fuel rods 17 inside the molds, may be placed in a nuclear reactor and irradiated.

As previously indicated, the mold 10 may be made of 100% zirconium or other suitable metal. The fuel stock 24 contains primarily uranium or other nuclear fuel, and also includes a selected weight percent of the selected alloying element, which for purposes of illustration will be zirconium. In determining the selected weight percent zirconium to be placed in the fuel stock 24, the zirconium in the mold 10 must be considered because in the process of producing the fuel rod, and during irradiation, some of the zirconium in the mold diffuses into the fuel stock, and some of the fuel stock diffuses into the mold. For this reason, the weight percent zirconium in the molten fuel stock is selected by first determining the average weight percent of zirconium which is desired in the combined mold/fuel rod end product. The weight percent of the zirconium in the mold added to the weight percent of zirconium in the fuel stock must equal the weight percent of the end product. For example, if the weight of a 100% zirconium mold were 50 gm, the desired weight percent zirconium of the end product (i.e., the combined mold and fuel rod) were about 17%, and the total weight of the melt actually used in the rod were 300 gm, the weight percent zirconium needed in the melt would be 3%, approximately satisfying the following equation:

$$(1.00 * 50gm) + (.03 * 300gm) = .17 * 350gm$$

Using the method described above, a 0.005 inch thick zirconium wall 12, a 0.175 inch outer diameter and a melt having about 6 wt % zirconium in a mixture of uranium and zirconium, would result in an average of about 10 wt % zirconium in the combined mold and fuel rod. If the wall were 0.010 inch thick, 1 wt % zirconium in the melt would produce a desired 10 wt % zirconium in the resulting end product. Molds made in such dimensions and content would then be irradiated in a nuclear reactor with the encased fuel rod.

Figure 4:
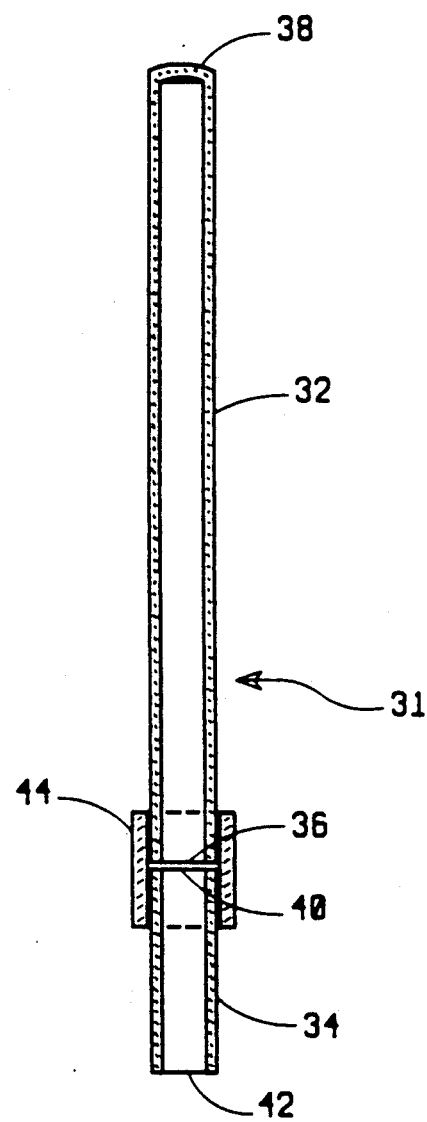
FIG. 4 is a cross-sectional side view of a two-part mold with a re-usable upper cavity made in accordance with the principles of this invention.

An alternate embodiment of the mold 10 is shown in FIG. 4. There, a reusable mold 31 includes a long cylindrical tube 32 and a shorter lower pipe 34. The tube may be between about 12 and 48 (and nominally 22) inches long and between about 0.005 and 0.1 inch thick, and the pipe 34 is long enough to be immersed in a melt, and is preferably no longer than about 3 inches.

The tube 32 and the pipe 34 can be made of quartz or any other suitable material which does not react with the molten fuel stock, such as pyrolytic boron nitride or yttria. A surface coating on the inside and outside portions of the pipe 34 which enter the molten fuel stock would protect the pipe from reacting with the molten fuel if the pipe were made of a material which would otherwise react with the fuel.

The tube 32 and the pipe 34 could be made of different materials, if desired. It is also contemplated that the tube 32 could be consumable, as in the embodiment of FIG. 1. In that event, the tube 32 could be made of zirconium or the like.

The tube 32 includes an open end 36 and an integral closed end 38. The pipe 34, on the other hand, is open at both ends 40, 42.

The end 40 of the pipe 34 may be removably secured adjacent to the open end 36 of the tube 32 by any suitable structure, such as a collar 44. A cement of ceramic powder or other suitable non-permanent adhesive may be used to secure the structure, if desired, although permanent adhesive is preferably not used on the tube 32 so the pipe 34 and the collar 44 can be removed after molding without destroying the tube 32.

Figure 5:
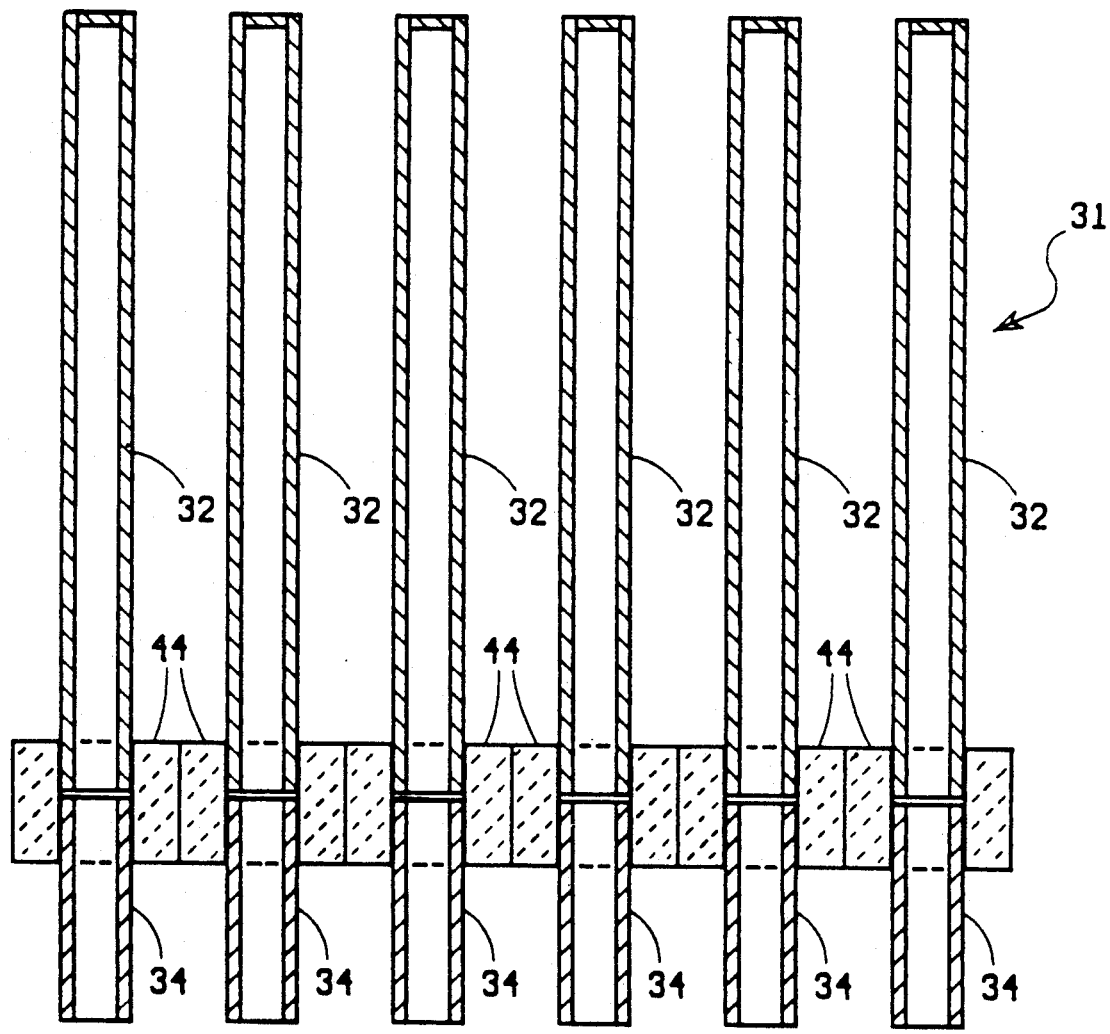
FIG. 5 is a cross-sectional side view of a plurality of the molds shown in FIG. 4.

Several molds 31 can be arranged in a desired array, as shown in FIG. 5. The molds 31 can be secured together by securing the collars 44 to each other, or by any other suitable structure. The use of multiple molds in this manner is desirable because it allows the fabrication of several fuel rods simultaneously. It is contemplated that about 100 fuel rods can be fabricated simultaneously using the described methods and apparatus.

The mold 31 is used in the same manner as the mold 10 in FIG. 1. That is, a plurality of molds 31 can be placed in one or both of the chambers 16 and dipped into the molten fuel stocks 24 in the crucibles 22. When the molds 31 are filled with molten fuel, they can be removed to cool. The pipes 34 are removed and the fuel rods are removed from the tubes 32, without destroying the tubes. In this manner, the tubes 32 can be re-used.

Figure 6:
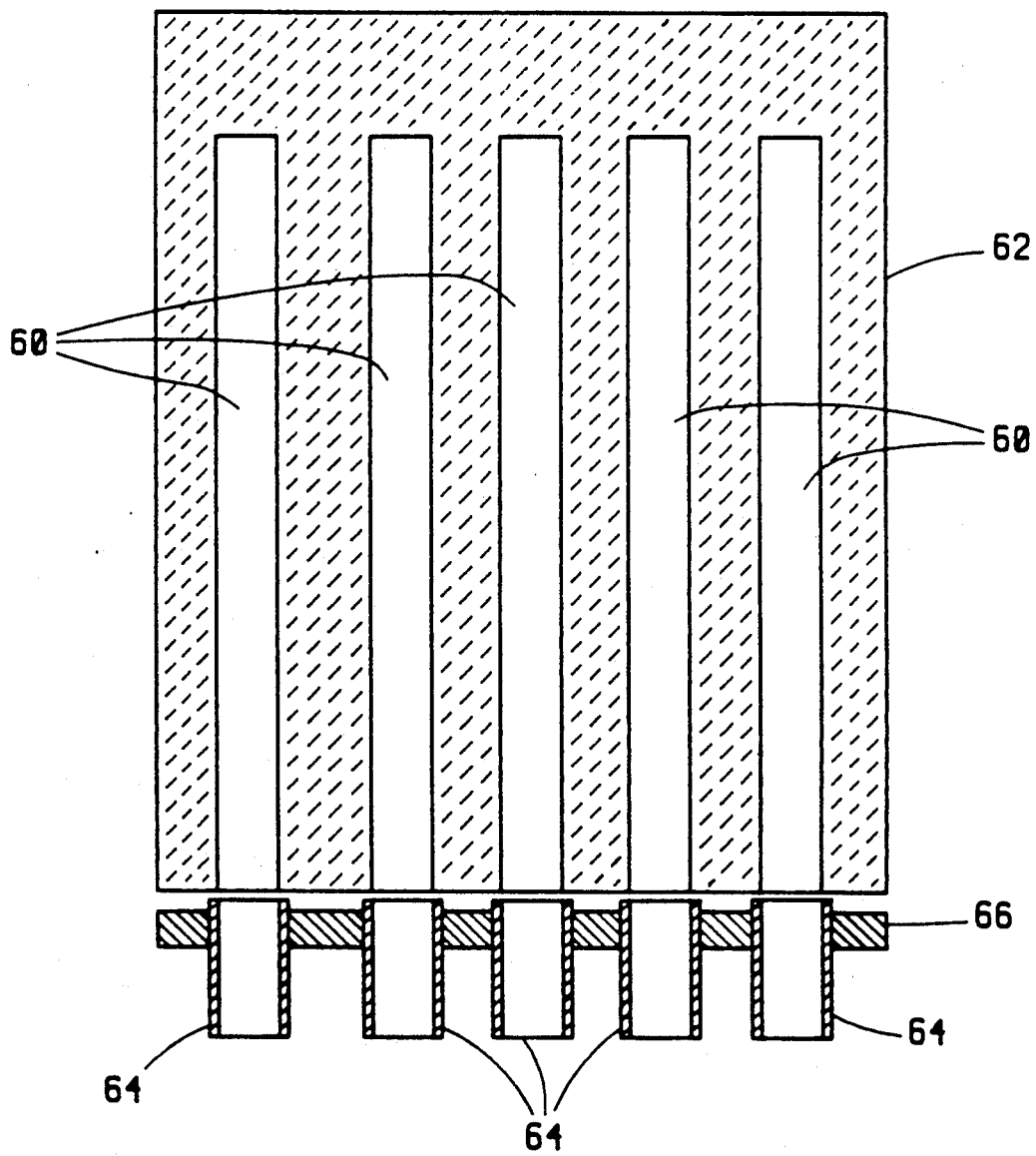
FIG. 6 is a cross-sectional side view of a plurality of upper mold cavities such as those shown in FIG. 5 in a monolithic structure.

Multiple fuel rods can also be fabricated simultaneously by producing a one-piece structure which includes a plurality of molds, or by providing a plurality of long cavities 60 in a re-usable monolithic mold 62, as shown in FIG. 6. The mold 62 could be used alone by making it of yttria or some other suitable material which does not react with the nuclear fuel. Alternatively, a plurality of disposable pipes 64 can be secured to each other by a beam 66, and the beam 66 can be secured to the mold 62 by any suitable structure. The beam 66 and pipes 64 can be removed after the fuel rods are molded. The fuel rods can then be removed from the mold 62.

While the consumable and re-usable molds just described have a closed end and are filled by an interior vacuum and exterior pressure, it is contemplated that the closed ends could be open, and a vacuum could be created at those ends which would draw molten fuel into the mold cavities.

The many advantages of this invention are now apparent. New and improved methods and apparatus for injection casting metallic fuel rods for the production of nuclear energy are provided. The new and improved molds reduce radioactive waste, either because they are consumable with the rods when the rods are irradiated, or are at least partially reusable. Moreover, the re-usable molds are more efficient because a new mold does not have to be fabricated for each rod.

While the principles of the invention have been described above in connection with specific apparatus and applications, it is to be understood that this description is made only by way of example and not as a limitation on the scope of the invention.

The embodiments of this invention in which an exclusive property or priviledge is claimed are defined as follows:

1. Apparatus for producing a metallic nuclear energy fuel rod from a melt containing a selected concentration of nuclear fuel and a selected concentration of an alloying element, said apparatus comprising:
   means for containing said melt including an alloying element whereby said fuel rod produced in said means for containing and said means for containing have an average concentration of nuclear fuel and said alloying element equal to:

$$(\% \text{ AE in mold} * NM) + (\% \text{ AE in TMM} * TMM) = (DAC * CMR)$$

where
   AE = alloying element (gm)
   NM = mold mass (gm)
   TMM = total melt mass (gm)
   DAC = desired average concentration of alloying element in combined mold and fuel rod
   CMR = combined mass of mold and fuel rod (gm)

and said apparatus for producing a metallic nuclear fuel rod having a cylindrical inner wall which forms a cavity having two opposed ends; and
   means for sealing a selected end of said inner wall, and said means for sealing being attached to said selected end of said inner wall and wherein said other opposed end of said inner wall is open.

2. The apparatus of claim 1 wherein said means for sealing said selected end of said inner wall comprises an end piece which is secured to said selected end to form a seal.

3. The apparatus of claim 1 wherein said inner wall and said means for sealing said selected end of said wall are intergral.

4. The apparatus of claim 1 wherein said cavity is between about 12 and 48 inches long, and said inner wall is between about 0.005 and 0.1 inch thick.

5. The apparatus of claim 1 wherein said alloying element includes zirconium and said nuclear fuel includes uranium.

6. The apparatus of claim 1 wherein said means for sealing comprises:
   a plate having the ability to connect a plurality of means for containing said melt and allowing for the uniform filling of said means for containing.

7. An apparatus for producing a metallic nuclear energy fuel rod from a melt of a selected nuclear fuel and an alloying element comprising:
   a tube, including an alloying element selected to react and fuse with said nuclear to form an alloy, having cylindrical inner walls which form a cavity, and two opposed ends;
   means for sealing a selected end of said tube and closing said selected end while leaving said other opposed end open;
   a reuseable pipe;
   means for securing said reusable pipe to said tube and having the ability to be removed prior to said fuel rod being molded and said reusable pipe having an inner wall with two open ends forming a second cavity therewithin, said reusable pipe being composed of an element non-reactive to said melt; and
   wherein said means for securing allows for the removal of said pipe after fuel rod has been molded, thereby essentially minimizing the creation of hazardous radioactive waste incident to the formation of the fuel rod.

8. The apparatus of claim 7 wherein said alloying element includes zirconium.

9. The apparatus of claim 7 wherein said tube and said fuel rod comprises an average concentration of nuclear fuel and said alloying element equal to:

$$(\% \text{ AE in mold} * NM) + (\% \text{ AE in TMM} * TMM) = (DAC * CMR)$$

Where
AE = alloying element (gm)
NM = mold mass (gm)
TMM = total melt mass (gm)
DAC = desired average concentration of alloying element in combined mold and fuel rod
CMR = combined mass of mold and fuel rod (gm).

10. The apparatus of claim 7 wherein said reusable pipe has an outer surface coating which does not react with the fuel.

11. The apparatus of claim 9 wherein said securing means comprises a collar which surrounds said tube and said pipe, said pipe being secured to said collar by a non-permanent adhesive.

12. The apparatus of claim 11 wherein said cavity of said tube is between about 12 and 48 inches long and between about 0.005 and 0.1 inches in diameter, and said second cavity of said pipe is sufficiently long to immerse said pipe in said melt, and is less than 3 inches long.

13. The apparatus of claim 10 wherein said reusable pipe includes material selected form the group consisting of pyrolytic boron nitride, yittria, and quarts with a surface coating of yittria.

* * * * *

UNITED STATES PATENT AND TRADEMARK OFFICE
CERTIFICATE OF CORRECTION

PATENT NO. : 5,044,911

DATED : September 3, 1991

INVENTOR(S) : Bobby R. Seidel, et al

It is certified that error appears in the above-identified patent and that said Letters Patent is hereby corrected as shown below:

Col. 8, line 4, delete "form" and insert --from--.

Col. 8, line 5, delete "quarts" and insert --quartz--

Signed and Sealed this

Thirteenth Day of April, 1993

Attest:

STEPHEN G. KUNIN

*Attesting Officer*  *Acting Commissioner of Patents and Trademarks*